United States Patent
Steil et al.

(10) Patent No.: US 6,386,508 B1
(45) Date of Patent: May 14, 2002

(54) ACTUATOR HAVING DUAL PISTON SURFACES

(75) Inventors: Fred Steil, Lake Orion; Lawrence J. Navarre, Leonard; Douglas Hugo, Chesterfield, all of MI (US)

(73) Assignee: D-M-E Company, Madison Heights, MI (US)

( * ) Notice: Subject to any disclaimer, the term of this patent is extended or adjusted under 35 U.S.C. 154(b) by 0 days.

(21) Appl. No.: 09/587,462

(22) Filed: Jun. 5, 2000

(51) Int. Cl.$^7$ .................. F16K 31/143; B29C 45/23
(52) U.S. Cl. .................. 251/31; 251/63.5; 425/564; 91/508; 92/62; 92/65
(58) Field of Search .................. 251/31, 63.5; 425/564, 425/566; 91/508; 92/62, 65

(56) References Cited

U.S. PATENT DOCUMENTS

| | | |
|---|---|---|
| 3,752,040 A | 8/1973 | Pawloski et al. |
| 3,880,051 A | 4/1975 | Eppler |
| 5,191,825 A | 3/1993 | Beneteau et al. |
| 5,368,470 A | 11/1994 | Manner |
| 5,375,994 A | 12/1994 | Friderich |
| 5,483,796 A | 1/1996 | Ando |
| 5,660,369 A | * 8/1997 | Gauler .................. 251/63.5 |

FOREIGN PATENT DOCUMENTS

JP 4320820 11/1992

* cited by examiner

Primary Examiner—Kevin Lee
(74) Attorney, Agent, or Firm—Stephen H. Friskney

(57) ABSTRACT

A pressurized-fluid-operated actuator has two piston surfaces for providing increased output force. The actuator includes a hollow piston that is divided into two inner chambers by a stationary inner dividing wall that is rigidly connected with a cylinder end wall. The piston has an outer diameter that is smaller than the inner diameter of the cylinder, and the piston carries three axially spaced sealing rings that define two axially-spaced annular chambers between the piston and the cylinder. Each of the annular chambers is in fluid communication with a respective port provided in the cylinder wall. Introduction of pressurized fluid into one port causes the fluid pressure to act on a single piston surface to retract the piston and rod, and introduction of pressurized fluid into the other port causes the fluid pressure to act on two axially-spaced piston surfaces to provide an increased output force without increasing the diameter of the cylinder and piston and without increasing the pressure of the fluid.

13 Claims, 3 Drawing Sheets

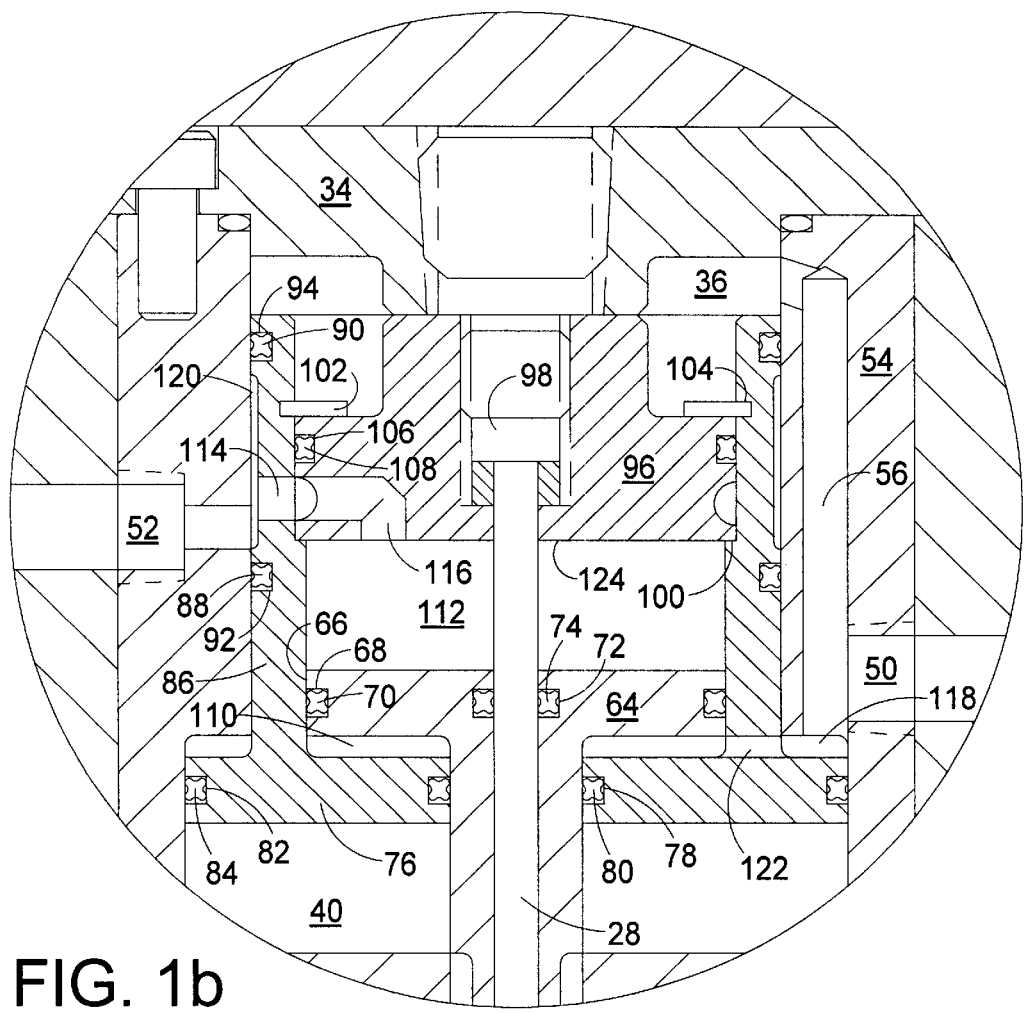
FIG. 1b
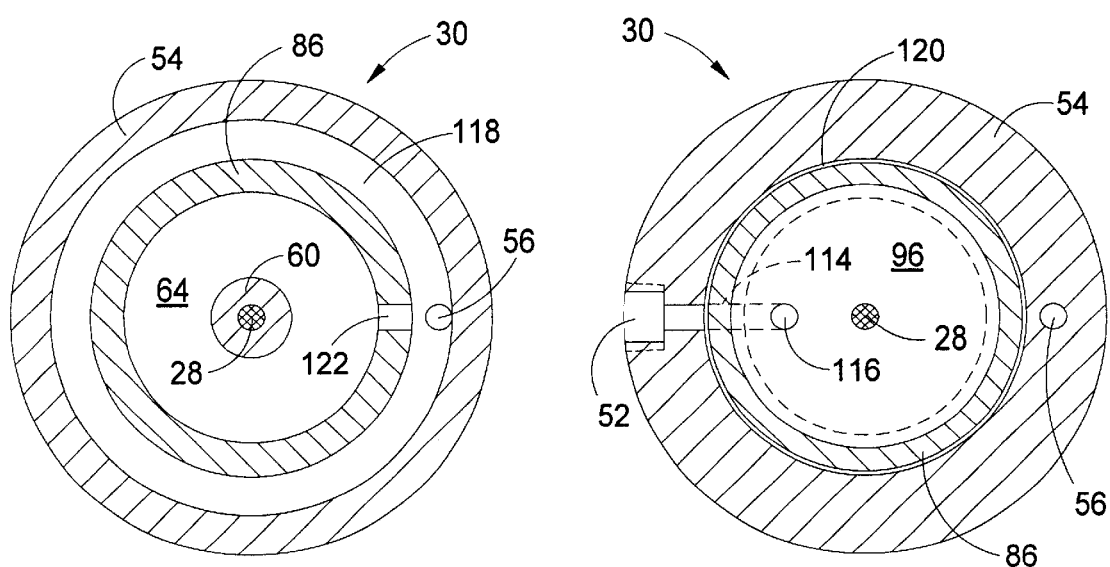
FIG. 2
FIG. 3

ACTUATOR HAVING DUAL PISTON SURFACES

BACKGROUND OF THE INVENTION

1. Field of the Invention

The present invention relates to a pressurized-fluid-operated, piston-cylinder-type, linear actuator having a plurality of piston surfaces within a unitary cylinder for providing a higher output force for a given cylinder diameter and a given pressure of the pressurized fluid. More particularly, the present invention relates to a pressurized-fluid-actuated actuator of compact size and that includes a single movable piston having two axially spaced pressure surfaces for increased actuating force and for movement of the piston in a first direction, and an additional, single pressure surface for moving the piston in a second direction opposite from the first direction.

2. Description of the Related Art

Pressurized-fluid-operated linear actuators incorporating pistons movable within cylinders are well known in the art and are used for many different purposes, including providing sufficient force to actuate a device or to move one or more members of a combination of elements. Generally, the output force provided by such actuators can be increased either by increasing the pressure of the fluid utilized to operate the actuator, or by increasing the surface area of the piston, which also requires an increase in the diameter of the cylinder within which the piston is contained. At times, however, the available space within which an actuator must be positioned is very limited, and often the available space is not sufficient to allow an increase in the cylinder diameter. Additionally, at other times the available pressure of the pressurized fluid may be inadequate to provide the desired output force from an actuator having a given diameter. It is therefore desirable to be able to provide an actuator structure that will enable a small actuator to provide the output force of a larger diameter actuator, or to be able to provide the same or a higher output force when supplied with pressurized fluid at a lower pressure.

A number of actuator structures have been devised to respond to the problems noted above. For example, in U.S. Pat. No. 3,880,051, entitled "Pneumatic System Including Auxiliary Output," which issued on Apr. 29, 1975, to Eppler, there is disclosed a dual chamber cylinder in each chamber of which a separate, independent piston is slidably provided. The piston rod of one piston extends into the adjacent chamber and includes an axial passageway through the piston and piston rod to allow the fluid pressure at the head end of one piston to be communicated to the head end of the second piston while the piston rod of the first piston is in contact with the head of the second piston. As a result, the output force of the piston rod of the second piston is multiplied without an increase in either the cylinder diameter or the pressure of the operating fluid.

Another form of multiple chamber linear actuator is disclosed in U.S. Pat. No. 3,752,040, entitled "Multi Piston Power Pack Unit for Fluid Actuated Tool," which issued on Aug. 14, 1973, to Pawloski et al. This reference shows a force-multiplying actuator structure in which two axially spaced pistons that are physically interconnected are slidably carried in respective chambers within a single cylinder. The cylinder of the actuator is divided into two chambers by a fixed, interior dividing wall, and pressurized fluid from the head end of one chamber is communicated to the head end of the adjacent chamber by an axially-extending passageway that passes through the connecting member that interconnects the respective pistons.

Additional types of multiple chamber linear actuators are disclosed in U.S. Pat. No. 5,191,825, entitled "Low-Impact Air Cylinders," which issued on Mar. 9, 1993, to Beneteau et al., and in U.S. Pat. No. 5,483,796, entitled "Fluid Cylinder," which issued on Jan. 16, 1996, to Ando. In each of those patents three coaxial pistons are provided within a single outer cylinder for providing increased output force. In the Beneteau et al. patent two of the pistons are interconnected, and each piston is carried in a separate chamber. One of the two interconnected pistons is slidably received within the third piston. In the structure disclosed in the Ando patent the three pistons are concentrically disposed within a cylinder that does not include a fixed inner dividing wall.

A further form of multiple chamber linear actuator is shown in U.S. Pat. No. 5,368,470, entitled "Multiple Pin Closure Nozzle Assembly for Injection Molds," which issued on Nov. 29, 1994, to Männer and U.S. Pat. No. 5,375,994, entitled "Piston Driven Pin Closure Nozzle Assembly," which issued on Dec. 27, 1994, to Friderich et al., as well as Japanese Patent Publication No. 4-320820, entitled "Mold Device for Injection Molding," which was published on Nov. 11, 1992. In these references, the pressurized fluid cylinder is divided into two pressure chambers (three chambers in the Friderich patent), within each of which is disposed a respective drive piston for multiplying the output force of the actuator by combining the output forces provided by the individual pistons.

Although the art discloses various structures for providing increased output force from a pressurized-fluid-operated actuator, the structures shown in each of the above-identified references require either a significant increase in the axial length of the actuator, or a significant increase in the diameter of the actuator cylinder, or they involve a complex structure having many internal parts. As a result, the disclosed structures have limited applicability in confined spaces.

It is therefore an object of the present invention to overcome the shortcomings of the prior art devices and to provide a pressurized-fluid-operated cylinder that can provide a desired increased force output without significant enlargement of the size of the actuator cylinder.

It is another object of the present invention to provide a compact linear actuator for operating a valve pin in a valve gate of an injection mold assembly.

SUMMARY OF THE INVENTION

Briefly stated, in accordance with one aspect of the present invention an actuator is provided that includes an outer cylinder of tubular form that defines an inner cylindrical surface and that has a longitudinal axis. A piston is slidably carried within the outer cylinder for axial movement therewithin and has a rod affixed thereto, the rod extending from the piston in an axial direction relative to the outer cylinder. The piston divides the outer cylinder into a head end chamber and a rod end chamber that is axially spaced from the head end chamber. The piston also includes an inner cylindrical space.

A dividing wall extends transversely across the inner cylindrical space within the piston and at a fixed axial position relative to the outer cylinder, thereby dividing the inner cylindrical space into a first inner chamber and a second inner chamber. A first fluid conduit is in fluid communication with the head end chamber of the outer cylinder and with the first inner chamber for moving the piston and rod in a first axial direction relative to the outer cylinder, to cause the rod to move in a outward direction relative to the outer cylinder to provide a rod extension stroke when pressurized fluid is introduced into the first fluid conduit.

A second fluid conduit is in fluid communication with the second inner chamber for moving the piston and rod in a second axial direction relative to the outer cylinder and opposite from the first axial direction, to cause the rod to move in an inward direction relative to the outer cylinder and to provide a rod retraction stroke when pressurized fluid is introduced into the second fluid conduit.

BRIEF DESCRIPTION OF THE DRAWINGS

FIG. 2 is a cross-sectional view of the actuator in accordance with the present invention, taken along the line 2—2 of FIG. 1.

FIG. 3 is a cross-sectional view of the actuator in accordance with the present invention, taken along the line 3—3 of FIG. 1.

DESCRIPTION OF THE PREFERRED EMBODIMENTS

Figure 1A:
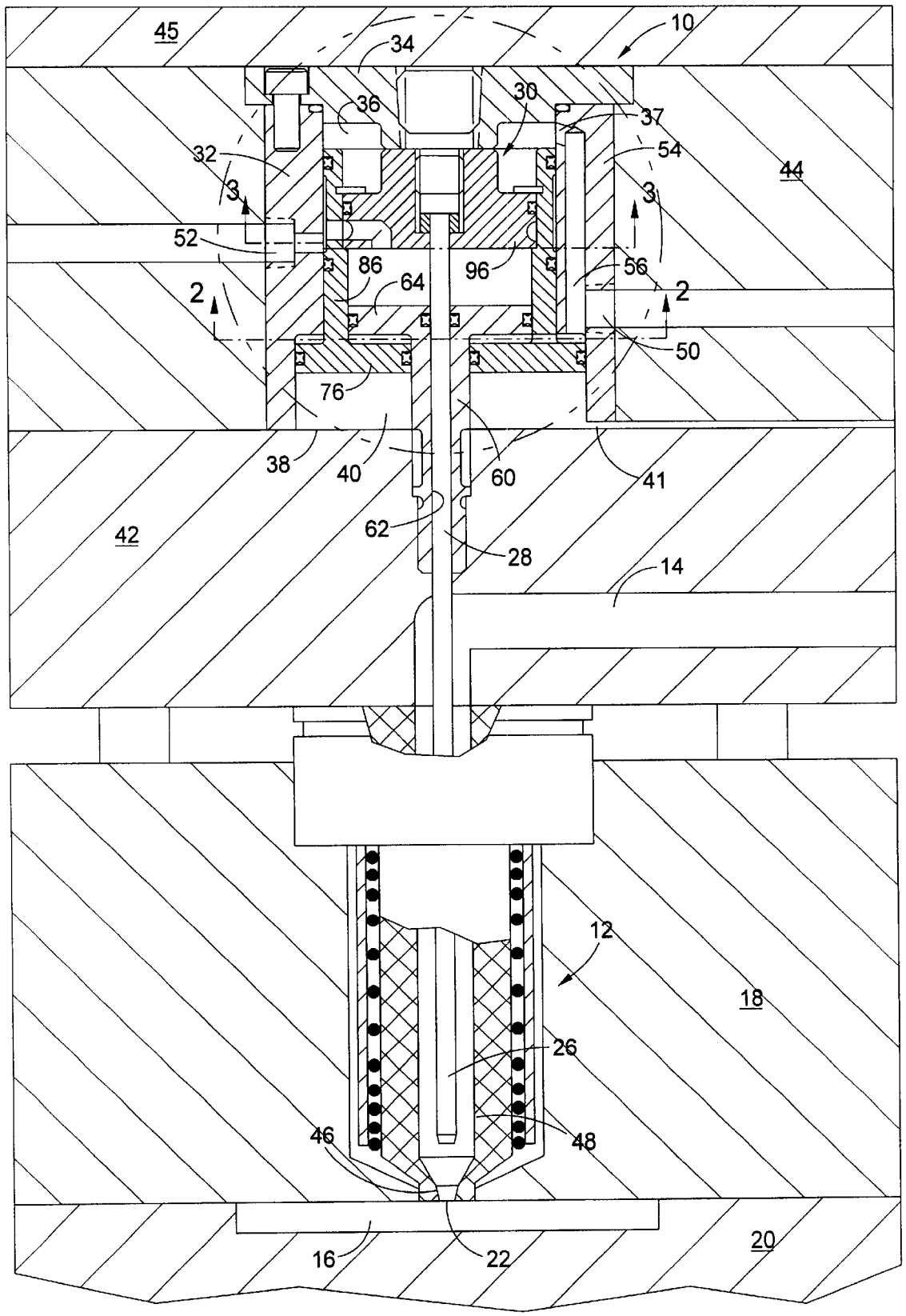
FIG. 1 is a fragmentary, side elevational view, in cross section, of a portion of a mold assembly in an injection molding machine showing a pressurized-fluid-operated actuator in accordance with the present invention operatively associated with a valve gate for controlling the flow of plasticated material to a mold cavity, wherein the piston is in a retracted position so that the valve pin is in the open position to allow flow of plasticated material into the mold cavity.

Referring to the drawings, and particularly to FIG. I thereof, there is shown a pressurized-fluid-operated actuator 10 in accordance with the present invention. Operatively associated with the actuator 10 is a flow nozzle 12 for conveying and for controlling the flow of molten plastic material from an injection unit (not shown) through a molding material passageway 14 in the nozzle 12 to a mold cavity 16 that is defined by respective opposed, suitably-shaped recesses formed in a first mold member 18 and a cooperating second mold member 20. As will be appreciated by those skilled in the art, the first mold member 18 is maintained in a stationary condition. The second mold member 20 is supported for movement toward the first mold member 18 to define the closed mold cavity 16 when the mold members 18 and 20 are in contacting relationship, and it is movable away from the first mold member 18 to open the mold cavity 16 to allow removal of a molded part.

The molten plastic material from the injection unit is caused to flow through the molding material passageway 14, into the nozzle 12 that includes a discharge outlet or gate 22 that conveys the molding material into the mold cavity 16. Flow of the molten plastic material through the nozzle 12 is controlled by a valve pin 26 that is movable toward and away from the gate 22 to close and open selectively the outlet 22 at appropriate times during a molding cycle. As represented in FIG. 1, the valve pin 26 is in the retracted or open position, to allow flow of molten plastic material through the nozzle 12 and into the mold cavity 16.

The valve pin 26 is an end portion of an elongated rod 28 that has its opposite end connected with a movable piston 30 that is slidably received within an outer cylinder 32. A first end wall 34 closes one end of the outer cylinder 32 to define with the piston 30 a head end chamber 36. A second end wall 38 closes the opposite end of the outer cylinder 32 to define with the piston 30 a rod end chamber 40. The second end wall 38 can be formed by a plate 42, which forms part of a multiple plate assembly to confine the actuator 10. As shown, the actuator 10 is fitted in an appropriately sized bore in a middle plate 44 attached to the plate 42, and an upper plate 45 is attached to the middle plate 44 to fully contain the actuator 10. The plate 42 defining the second end wall 38 is suitably secured relative to the nozzle 12 in mold member 18 so that the rod 28 and the valve pin 26 are properly oriented relative to the valve seat 46 in the nozzle 12. As shown, the valve seat 46 includes a tapered passageway that diverges from the gate 22 to a cylindrical bore 48 that interconnects with the passageway 14.

The outer cylinder 32 includes a first port 50 and a second port 52, each of which is alternately adapted to be in communication with a source of pressurized fluid (not shown), such as pressurized gas or pressurized hydraulic fluid, and with a lower pressure fluid reservoir (not shown). The connections between the ports 50, 52 and the respective pressurized fluid source and lower pressure fluid reservoir can be effected through a suitable reversible flow control valve (not shown) of a type that is well known to those skilled in the art.

The first port 50 extends only partially through the side wall 54 of the outer cylinder 32 and terminates at a channel 56 that extends in an axial direction within the side wall 54 and toward the end wall 34. The channel 56 opens into the head end chamber 36 at an opening 37 to permit fluid communication between the head end chamber 36 and the first port 50. A first annular chamber 118 is provided at the end of the channel 56 opposite the opening 37 to enable fluid communication between the channel 56 and the interior of the piston 30 for purposes that will be hereinafter explained. Also extending through the cylinder side wall 54 is a passage or vent opening 41 to vent the rod end chamber 40 to the ambient atmosphere.

The second port 52 extends through the side wall 54 of the outer cylinder 32 to provide communication alternately between the interior of the cylinder 32 and each of the source of pressurized fluid (not shown) as well as the lower pressure fluid reservoir (not shown). The second port 52 is spaced axially along the cylinder 32 from the first port 50 and is located between the first port 50 and the first end wall 34.

Positioned within the outer cylinder 32 is a rod support sleeve 60 that passes through the second end wall 38 and is rigidly connected in the plate 42. The support sleeve 60 defines a bore 62 within which the rod 28 is axially slidably carried, and it extends into the interior of the outer cylinder 32 to terminate at a transversely-extending inner dividing wall 64. The dividing wall 64 is a disk-shaped member that has a peripheral edge 66 that is spaced inwardly of the inner surface of the cylinder side wall 54. The peripheral edge 66 includes an annular recess 68 to receive a peripheral sealing ring 70. The dividing wall 64 also includes an inner annular recess 72 to receive an inner sealing ring 74 for sealing contact with the outer surface of the rod 28.

The piston 30 is a hollow, generally cylindrical structure that is received within the outer cylinder 32 for axial, sliding movement along the inner surface thereof. The piston 30 includes an annular piston end wall 76 that extends transversely inside the outer cylinder 32 between the inner surface of the cylinder side wall 54 and the support sleeve 60. The piston end wall 76 includes an inner annular recess 78 to receive an annular sealing ring 80 that is slidable along and that sealingly engages the outer surface of the support sleeve 60, and an outer peripheral recess 82 to receive a first outer sealing ring 84 that is slidable along and that sealingly engages the inner surface of the cylinder side wall 54. The piston end wall 76 is positioned between the dividing wall 64 and the cylinder second end wall 38.

Extending axially from the periphery of the piston end wall 76 adjacent and along the inner surface of the cylinder side wall 54 and toward the cylinder first end wall 34 is a tubular piston wall 86. A second outer sealing ring 88 and a third outer sealing ring 90 are each carried in annular recesses 92 and 94, respectively, on the outer periphery of the piston wall 86 in axially spaced relationship with the first outer sealing ring 84 and in axially spaced relationship with each other. Each of the second and third sealing rings 88, 90 are slidable along and sealingly engage the inner surface of the cylinder side wall 54.

Spaced axially along the piston wall 86 from the piston end wall 76 and on the opposite side of the dividing wall 64 from the piston end wall 76 is a piston head 96 that is defined by a transverse wall that extends across the interior of the piston wall 86. The end 98 of the rod 28 opposite from the valve pin 26 is securely received within the piston head 96, so that both the piston head 96 and the valve pin 26 move together. If desired, the end 98 of the rod 28 can be threadedly received in the piston head 96 to enable adjustment of the length of the rod 28 that extends into the nozzle 12. As shown most clearly in FIG. 1b, the inner surface of the piston wall 86 includes a radial step 100 against which the piston head 96 rests, and an annular retaining ring 102 is received in an inner peripheral groove 104 formed in the inner surface of the piston wall 86 to retain the piston head 96 in position relative to the piston wall 86. Additionally, the piston head 96 also can include an outer peripheral recess 106 to receive an annular sealing ring 108.

Figure 4:
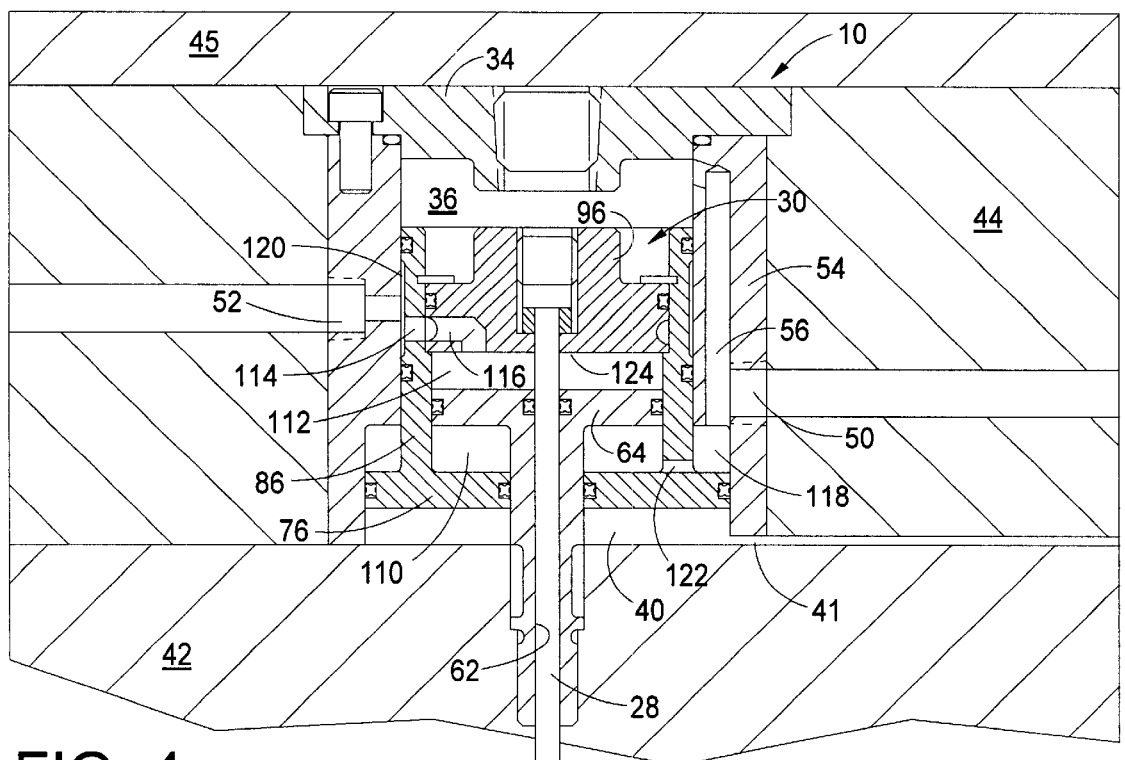
FIG. 4 is a partial side elevational view similar to that of FIG. 1, showing the piston of the actuator in an intermediate position between fully retracted and fully extended positions.

As best seen in FIG. 4, the annular volume between the piston end wall 76 and the dividing wall 64 defines a first inner chamber 110 within the piston 30, and the annular volume between the piston head 96 and the dividing wall 64 defines a second inner chamber 112 within the piston 30. The piston wall 86 includes a radially-extending opening 114 that extends from the outer periphery thereof to the second inner chamber 112. If the piston head 96 has a substantial axial thickness, as shown in FIG. 1, the piston head 96 can include an L-shaped passageway 116 to provide fluid communication between the second inner chamber 112 and the radial opening 114.

The outer diameter of the piston wall 86 is configured in cooperation with the inner diameter of the cylinder side wall 54 to provide an annular space therebetween, see FIGS. 2, and 3. The annular space between the first outer sealing ring 84 and the second outer sealing ring 88 defines a first annular chamber 118 and the annular space between the second outer sealing ring 88 and the third outer sealing ring 90 defines a second annular chamber 120. In that regard, the first annular chamber 118 is in continuous fluid communication with the channel 56, and thereby with the first port 50. Similarly, the second annular chamber 120 is in continuous communication with the second port 52, with the radial opening 114 in the piston wall 86, and with the L-shaped passageway 116. Additionally, the piston wall 86 includes a radial slot 122 adjacent the piston end wall 76 to provide fluid communication between the first inner chamber 110 and the first annular chamber 118.

The actuator 10 is shown in FIG. 1 with the piston 30, rod 28, and valve pin 26 each in their retracted positions, relative to the outer cylinder 32 and to the valve seat 46. In operation, to cause the valve pin 26 and piston 30 to move from their retracted positions, pressurized fluid is introduced through the first port 50, while the second port 52 is in fluid communication with a lower pressure fluid reservoir, or the like. The introduction of pressurized fluid at the first port 50 causes the pressurized fluid to enter into and to flow through the axial channel 56 and opening 37 into the head end chamber 36. Simultaneously, a portion of the pressurized fluid flows through the opposite end of channel 56 to enter into the first annular chamber 118. Pressurized fluid flows from the first annular chamber 118 through the radial slot 122 and into the first inner chamber 110 within the piston 30. Consequently, each of the head end chamber 36 and the first inner chamber 110 are at an elevated pressure, relative to the rod end chamber 40, which is vented to the atmosphere through the vent opening 41, and relative to the second inner chamber 112, which is in fluid communication with the lower pressure fluid reservoir through the L-shaped passageway 116, radial opening 114, second annular chamber 120, and second port 52.

Figure 5:
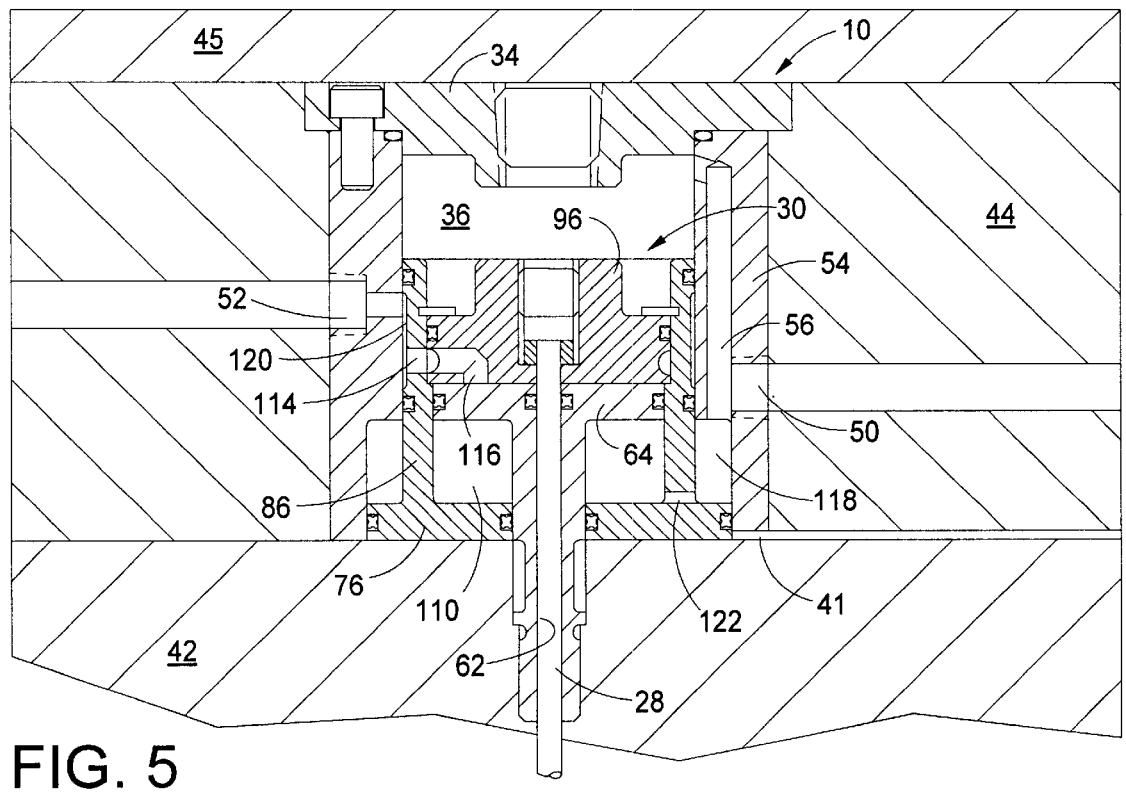
FIG. 5 is a partial side elevational view similar to that of FIGS. 1 and 4 showing the piston of the actuator in a fully extended position.

The resultant pressure differentials acting against each of the piston head 96 and piston end wall 76 cause the piston 30 to move toward the second end wall 38 of the cylinder 32, which causes the valve pin 26 to move outwardly relative to the outer cylinder 32 from their relative positions as shown in FIG. 1 to their relative positions as shown in FIG. 4. During that time interval the volume of each of the rod end chamber 40 and the second inner chamber 112 is decreasing, while the volume of each of the first inner chamber 110 and head end chamber 36 is increasing. At the same time, any fluid within the second inner chamber 112 passes through the L-shaped passageway 116 in the piston head 96, through the radial opening 114, into the second annular chamber 120 and out the second port 52, which is at a lower pressure than is the first port 50. The continued application of greater fluid pressure at the first port 50 will cause the piston 30 to travel to the end of its extension stroke, as shown in FIG. 5, at which position the piston end wall 76 is in abutment with the cylinder second end wall 38, and the outermost end of the valve pin 26 will be against the valve seat 46 to block flow through the gate 22. To avoid the resistance that would otherwise act against the piston end wall 76 within the rod end chamber 40, air contained within the chamber 40 is exhausted through the vent opening 41.

In order to open the valve and allow the flow of molten plastic material into the mold cavity 16, the first port 50 is disconnected from the source of pressurized fluid and is placed in communication with a lower pressure reservoir, or the like. The second port 52 is then connected with the source of pressurized fluid, and pressurized fluid enters the second annular chamber 120 through the second port 52. From the second annular chamber 120 the pressurized fluid flows through the radial opening 114 in the piston wall 86 and into the second inner chamber 112 within the piston 30, thereby imposing a greater pressure against the inner surface 124 of the piston head 96, and causing the piston 30 and the valve pin 26 to retract into the outer cylinder 32. As a result, the valve pin 26 retracts into the nozzle 12 and away from the gate 22 to allow molding material to flow through the nozzle 12. The reduced air pressure that would otherwise be generated within the rod end chamber 40 is relieved by allowing ambient air to enter the rod end chamber 40 through the vent aperture 41.

It will therefore be apparent that an actuator in accordance with the present invention provides a greater output force within the same cylinder diameter, thereby allowing such an actuator to be utilized in confined spaces that would preclude larger diameter cylinders if higher actuation forces were needed. If a similar space limitation existed but a higher actuation force than would be available using a single piston were needed with only a relatively low fluid pressure source available, the actuator in accordance with the present invention would provide an increased actuation force at that lower fluid pressure.

The foregoing discussion and the illustrated embodiment of the invention have been in the context of the use of the actuator in a plastics injection molding machine for controlling the flow of molten plastic material from an injection unit to a mold cavity. However, it will be appreciated that the use of such an actuator is not limited to such a molding operation. In fact, the inventive actuator can be employed in other applications, such as in pneumatically or hydraulically operated tools, where space is limited or where available fluid pressures are low, yet increased actuation forces are needed. It will be apparent to those skilled in the art that various changes and modification can be made without departing from the concepts of the present invention. It is therefore intended to encompass within the appended claims all such changes and modification that fall within the scope of the present invention.

What is claimed is:

1. A pressurized-fluid-operated actuator comprising:
    a) a tubular outer cylinder defining an inner cylindrical surface, the outer cylinder having a longitudinal axis;
    b) a piston slidably carried within the outer cylinder for axial movement therewithin and having a rod affixed thereto, the rod extending from an end of the piston in an axial direction relative to the outer cylinder, wherein the piston divides the outer cylinder into a head end chamber and a rod end chamber that is axially spaced from the head end chamber, and wherein the piston includes an inner cylinder;
    c) a dividing wall extending transversely within the inner cylinder and at a fixed axial position relative to the outer cylinder to divide the inner cylinder into a first inner chamber and a second inner chamber;
    d) a first fluid conduit in fluid communication with the head end chamber and with the first inner chamber for moving the piston and rod in a first axial direction relative to the outer cylinder, to cause the rod to move in a outward direction relative to the outer cylinder to provide a rod extension stroke when pressurized fluid is introduced into the first fluid conduit; and
    e) a second fluid conduit in fluid communication with the second inner chamber for moving the piston and rod in a second axial direction relative to the outer cylinder and opposite from the first axial direction, to cause the rod to move in an inward direction relative to the outer cylinder to provide a rod retraction stroke when pressurized fluid is introduced into the second fluid conduit.

2. An actuator in accordance with claim 1, wherein the inner cylindrical space is substantially coaxial with the outer cylinder.

3. An actuator in accordance with claim 1, wherein movement of the piston within the outer cylinder in each axial direction of the outer cylinder is limited by the dividing wall.

4. An actuator in accordance with claim 1, wherein the dividing wall is a disc-shaped member and has a peripheral surface that is spaced inwardly of the inner cylindrical surface of the outer cylinder.

5. An actuator in accordance with claim 1, wherein the dividing wall is supported from an axially-extending support member that is in fixed position relative to the outer cylinder.

6. An actuator in accordance with claim 5, wherein the support member includes an axially-extending inner passageway for slidably receiving and supporting the rod.

7. An actuator in accordance with claim 1, wherein the piston includes an axially-extending skirt that has an outer surface spaced from the inner cylindrical surface of the outer cylinder to provide a first annular chamber therebetween that is in fluid communication with a first port formed in the outer cylinder, and wherein the axial extent of the first annular chamber is defined by a pair of axially-spaced sealing members carried on the outer surface of the piston.

8. An actuator in accordance with claim 1, wherein the piston includes an axially-extending skirt that surrounds the inner chamber and the skirt includes a fluid passageway that extends from an outer surface of the skirt to the inner chamber to define a portion of the second fluid conduit.

9. An actuator in accordance with claim 8, wherein the skirt outer surface is spaced from the inner cylindrical wall surface of the outer cylinder to define a second annular chamber, and wherein the second annular chamber is in fluid communication with a second port formed in the cylinder to define a second portion of the second fluid conduit.

10. An actuator in accordance with claim 7, wherein the piston includes an axially-extending skirt that surrounds the inner chamber and the skirt includes a fluid passageway that extends from an outer surface of the skirt to the inner chamber to define a portion of the second fluid conduit, and wherein the skirt outer surface is spaced from the inner cylindrical wall surface of the outer cylinder to define a second annular chamber, and wherein the second annular chamber is in fluid communication with a second port formed in the cylinder to define a second portion of the second fluid conduit.

11. An actuator in accordance with claim 1, wherein the piston includes a rod that is operatively connected with a valve member.

12. An actuator in accordance with claim 11, wherein the valve member is a gate valve for controlling the flow of molten plastic material into a mold gate connected with a mold cavity.

13. An actuator for operating a valve gate to supply a flow of plastic melt intermittently into a mold cavity of a mold assembly, said actuator comprising:
    a) a first cylindrical chamber;
    b) a movable piston received within the first chamber, the movable piston having a generally cylindrical outer wall and generally flat upper and lower end walls, thereby defining a second cylindrical chamber inside the movable piston;
    c) a stationary piston received within the second chamber;
    d) a support sleeve connecting the stationary piston to an element of the mold assembly;
    e) a rod attached to the upper end wall of the movable piston, the rod extending through aligned axial bores in the stationary piston and support sleeve, and having an end portion configured to form a valve pin at a point proximate a gate to the mold cavity;
    f) a first port communicating with both the first chamber and the second chamber; and
    g) a second port communicating with only the second chamber, such that admission of pressurized fluid through the first port generates forces acting on both end walls of the movable piston, thereby moving the valve pin to shut off flow to the gate, and admission of pressurized fluid through the second port generates a force acting on the upper end wall of the movable piston, thereby moving the valve pin to an open position, allowing flow through the gate and into the mold cavity.

* * * * *